Oct. 9, 1928.
A. R. RUTTER
1,686,712
ELECTRICAL MEASURING INSTRUMENT
Filed March 12, 1926
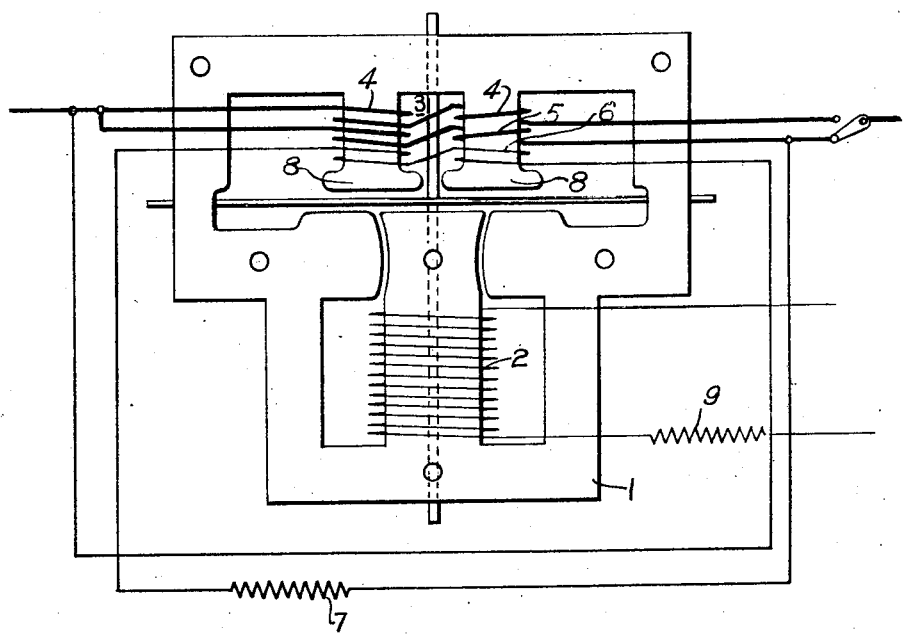
WITNESSES:
INVENTOR
Argyle R. Rutter.
BY
ATTORNEY Patented Oct. 9, 1928.

1,686,712

UNITED STATES PATENT OFFICE.

ARGYLE R. RUTTER, OF FOREST HILLS, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed March 12, 1926. Serial No. 94,190.

My invention relates to electric measuring instruments and particularly to watthour meters and other similar motor meters.

One object of my invention is to provide an instrument, of the above-indicated character, that shall have great accuracy in integrating measurements of power generated by small currents.

Another object of my invention is to provide an electric measuring instrument that shall be simple in construction, easy to manufacture and efficient in operation.

The measuring instrument embodying my invention comprises a series coil with two windings on the same pole member one superposed over the other to permit of measurements of power generated by currents of different values, and means for properly correcting the discrepancy of torque caused by the interference of the juxtaposed windings.

In the prior art, this discrepancy in torque caused by the juxtaposition of the plurality of windings on the series core becomes apparent only when the winding not contiguous to the poles is utilized; the torque is then less than the theoretical strength, due to diminution of the flux caused by the distance of the winding from the pole member and the influence of the winding which is interposed. The resulting error is partially compensated by winding a disproportionately large number of turns on the said winding to more than counterbalance the diminution of flux and then to reduce the effect of the winding to the proper intensity by decreasing the magnitude of the current flowing through the winding by means of a shunt resistance. This means provides the proper intensity of flux but it dissipates current and interferes with the power factor and thereby introduces a new error.

The measuring instrument embodying my invention has also a disproportionately large number of turns on the winding removed from the pole member to more than counterbalance the error caused by the interference of the winding next to the core but the effect of the winding is reduced to the proper intensity by a supplementary shunt winding on the same pole member in which the current causes a mitigating flux to flow in the direction opposite to that of the flux of the winding. The shunt winding is employed instead of the shunt resistance of the prior art.

The single figure of the accompanying drawing is a front elevational view of an electric measuring instrument embodying my invention.

A meter of the above-indicated character comprises, in general, a magnetizable core member 1, a voltage coil 2, a series coil 3 having three windings 4, 5 and 6 and a resistor 7.

The core member 1 and the voltage coil 2 which is connected in series with the resistor 9 are of usual forms, the invention residing particularly in the series coil 3.

The series coil 3 surrounds the pole members 8, and comprises three windings 4, 5 and 6. The pole members 8 are integral with the core member 1 and form opposite poles when wound with the windings to be hereinafter described.

The windings 4 and 5 are of the usual form of dual windings of such electric measuring instruments. The winding 4 is wound directly on the pole member and is the winding which is used to create the necessary flux for the electromagnetic field when power generated by heavier currents is to be measured. The winding 5 is wound on the pole members 8 over the winding 4 and is used to excite the electromagnetic field when power generated by small currents is to be measured. The winding 5 is wound with a sufficient number of turns to give the theoretical equivalent flux of the winding 4 and also a sufficient number of turns in addition to slightly more than compensate for the interference of winding 4.

The winding 6 is a supplementary winding wound on the pole members 8 over the windings 4 and 5 and is so connected in shunt relation to the winding 5, that the current in it flows in such direction that the flux generated opposes the flux generated by the winding 5. The conductor composing the winding 6 carries a current so small that many turns are necessary to give an inductive effect equal to the effect of one turn of the winding 5.

A novel feature of such shunt winding is that it not only provides means for adjusting the series flux to have the proper values at different loads, but it has also the desirable function of eliminating the power-factor error introduced by the usual resistor shunt placed around the series winding to adjust the series current to the proper magnitude. The shunt winding is wound on the series core to produce a flux that will neutralize the current induced in the short-circuit path of the shunt.

The resistor 7 is connected in series with the winding 6 and is of such sufficiently high resistance that the current permitted to flow is small.

When the winding 5 is utilized in the measurement of power generated by small currents, it creates an electromagnetic field of slightly greater intensity than the winding 4, but the winding 6 generates a sufficient flux in the opposite direction to counteract the excess flux generated by the winding 5 and an electromagnetic field of the proper intensity results, which is adapted to give accurate measurements of power generated by small current.

In the prior art, when the winding 4 was being utilized, a current was induced in the winding 5, by transformer action from the winding 4, that was shorted by a resistor that had been introduced in shunt-circuit relation with the winding 5 to properly adjust the amount of current traversing the latter. Such current seriously interfered with the phase angle of the series flux and introduced a power-factor error in the instrument. In accordance with my invention, the use of the auxiliary winding 6 for adjusting the amount of flux generated in the series core, the effect of short circuits in the shunt circuit are neutralized and the power-factor error otherwise present is substantially obviated.

The device, described above, provides efficient and simple means embodying all of the advantages and none of the disadvantages of the means utilized in the prior art that dissipated current and interfered with the power factor in the current being metered.

While I have shown and described a particular form of my invention, changes may be effected therein without departing from the spirit and scope thereof, as set forth in the appended claims.

I claim as my invention:

1. In combination with a plurality of series coils only one of which is in circuit relation for a given measurement, a circuit with a winding in shunt relation with one of said coils and a resistor in series relation to the shunt winding.

2. A motor meter comprising a series element having a plurality of separate windings and a winding inductively related to said series element in parallel-circuit relation with one of said windings.

3. A motor meter comprising a series element having a plurality of separate windings and means for neutralizing a portion of the flux produced by said series element in accordance with the magnitude of current traversing said series element.

4. A motor meter comprising a series element having a plurality of separate windings and means inductively related to said series element for neutralizing a portion of the flux produced by said series element in accordance with the magnitude of current traversing said series element.

5. A motor meter comprising a series element having a plurality of separate windings and means inductively related to said series element in parallel-circuit relation with one of said windings.

6. The method of adjusting the magnitude of the series flux of an induction meter which comprises neutralizing a portion of said series flux with an auxiliary flux.

7. The method of adjusting the magnitude of the series flux of an induction meter which comprises producing a flux proportional to a portion of said series flux but opposite in direction thereto.

8. An induction meter having series and shunt cooperating flux-producing coils comprising means for effecting a proper balance between said series coils and maintaining the power-factor relation between said fluxes, including an auxiliary winding in parallel-circuit relation with a series coil for neutralizing a portion of the flux generated by said series coil.

9. An induction meter having series and shunt cooperating flux-producing coils comprising means for effecting a proper balance between said series coils and maintaining the relation between said fluxes, including an auxiliary coil in reverse-inductive relation and parallel-circuit relation with one of said series coils.

10. In a meter, the combination with co-acting flux-producing series and voltage coils, of means for reducing the flux intensity of the series coil and for maintaining, at the same time, the angular phase relation between the fluxes of the series and voltage coils comprising an auxiliary coil electrically and magnetically associated with said series coil.

11. In a meter, the combination with co-acting flux-producing series and voltage coils, of means for reducing the flux intensity of the series coil and for maintaining, at the same time, the angular phase relation between the fluxes of the series and voltage coils comprising a winding in shunt-circuit relation to the series coil in which current flows in the direction opposed to the current in the series coil.

12. In a meter, the combination with a series winding for a given range of current values, a second series winding for a different range of current values having a resistor in parallel-circuit relation therewith, said series windings being inductively related to each other, of means for compensating said first named winding for the power factor error incident to said resistor shunted around said second named winding, comprising an auxiliary winding inductively associated with said series windings and in electric-circuit relation with said second named series winding.

In testimony whereof, I have hereunto subscribed my name this 5th day of March, 1926.

ARGYLE R. RUTTER.